(12) United States Patent
Lin

(10) Patent No.: US 8,174,760 B2
(45) Date of Patent: May 8, 2012

(54) ELECTRONIC DEVICE FOR BIOLOGICAL MICROSCOPY

(75) Inventor: Kuang-Yuan Lin, Hsinchu (TW)

(73) Assignee: Shanghai Microtek Technology Co., Ltd., Shanghai (CN)

( * ) Notice: Subject to any disclaimer, the term of this patent is extended or adjusted under 35 U.S.C. 154(b) by 616 days.

(21) Appl. No.: 12/320,949

(22) Filed: Feb. 10, 2009

(65) Prior Publication Data

US 2010/0118393 A1 May 13, 2010

(30) Foreign Application Priority Data

Nov. 7, 2008 (TW) ................................ 97220024 U

(51) Int. Cl.
*G02B 21/24* (2006.01)
(52) U.S. Cl. ........................................................ 359/368
(58) Field of Classification Search .................. 359/368, 359/369
See application file for complete search history.

(56) References Cited

U.S. PATENT DOCUMENTS

| | | | | |
|---|---|---|---|---|
| 5,331,458 A * | 7/1994 | Bacchi et al. | ................. | 359/393 |
| 6,106,457 A * | 8/2000 | Perkins et al. | ................. | 600/175 |
| 6,624,931 B2 * | 9/2003 | Katsumata et al. | ........... | 359/368 |
| 6,804,385 B2 * | 10/2004 | Eisfeld et al. | .................. | 382/128 |
| 2006/0050376 A1 * | 3/2006 | Houston et al. | ................ | 359/392 |
| 2006/0077538 A1 * | 4/2006 | Zahniser et al. | ............... | 359/368 |
| 2006/0139621 A1 * | 6/2006 | Baer et al. | ......................... | 356/36 |
| 2007/0121200 A1 * | 5/2007 | Suzuki et al. | .................. | 359/368 |
| 2009/0190129 A1 * | 7/2009 | Yguerabide et al. | .......... | 356/338 |
| 2009/0231691 A1 * | 9/2009 | Watanabe | ...................... | 359/383 |
| 2010/0213063 A1 * | 8/2010 | Zenhausern et al. | .......... | 204/452 |
| 2011/0254948 A1 * | 10/2011 | Eisfeld et al. | ................. | 348/135 |

* cited by examiner

*Primary Examiner* — Frank Font
(74) *Attorney, Agent, or Firm* — Rosenberg, Klein & Lee

(57) ABSTRACT

An electronic device for biological microscopy includes a display unit and a main body adapted to the display unit, wherein an auto-focus microscope, an inspection area, and a computer are housed within the main body. The inspection area includes a first side and a second side opposite to the first side. The microscope includes an object lens, an eye lens, and an extension lens configured between the object lens and the eye lens. The object lens is configured at the first side of the inspection area, and a lighting component is configured at the second side of the inspection area. A thermostat apparatus is configured on the inspection area. A camera electrically connected to the computer is configured on the eye lens and transmits the captured image to the computer for analysis with a pre-installed software.

13 Claims, 3 Drawing Sheets

ELECTRONIC DEVICE FOR BIOLOGICAL MICROSCOPY

BACKGROUND OF THE INVENTION

1. Field of the Invention

The present invention relates to a method for biological detection, and more particularly to an electronic device for biological microscopy.

2. Description of the Prior Art

FIG. 1 illustrates a conventional specimen analyzing system 100, which includes a display unit 110, a microscope integration apparatus 120, a keyboard 130, and a mouse 140. The microscope integration apparatus 120 includes a microscope, a camera, a thermostat apparatus, a computer, and an inspection support tray 122. The above-mentioned display unit 110, keyboard 130, mouse 140 are connected to the microscope integration apparatus 120 before use. The thermostat apparatus and computer are then turned on to keep the temperature within the thermostat apparatus at required value and a pre-installed analyzing software is operated to a "ready for specimen" state. For detecting, a slide containing the specimen is placed on the inspection support tray 122, and the inspection support tray 122 is then conveyed into the microscope integration apparatus 120. The specimen is then respectively observed and pictured via the microscope and camera in the microscope integration apparatus 120, and the image is then transmitted to the computer in the microscope integration apparatus 120 for further analysis.

FIG. 2 illustrates a conventional specimen analyzing system 200, which includes a display unit 210, a keyboard 220, and a microscope 230, a camera 240, a mouse 250, and a computer 260. The display unit 210, keyboard 220, mouse 250, and camera 240 are electrically connected to the computer 260 before use. The computer 260 is then turned on and a pre-installed analyzing software is operated to a "ready for specimen" state. For detecting, a slide containing the specimen is placed on a detecting platform 232 and then respectively observed and pictured via the microscope 230 and camera 240, and the image then is transmitted to the computer 260 for further analysis.

The two aforementioned conventional specimen analyzing systems require assembling the display unit, keyboard, mouse, and camera before use for detection. The drawbacks of the above-mentioned conventional specimen analyzing systems are suitable for use in the integrated health-care provided by community medical resource including family doctors, 5 to 10 local clinics, and regional hospitals, however not suitable for at-home service for the disabled and inconvenient areas. Therefore, it is now a current goal to provide an integrated specimen analyzing system that is capable of connecting to the network for remote health-care and pathological analysis.

SUMMARY OF THE INVENTION

Accordingly, one objective of the present invention is to provide an electronic device for biological microscopy capable of integrating all essential components into a single device, and having a simplified structure to enhance practicability, portability, and increase convenience. The electronic device for biological microscopy may be easily implemented as at-home health care and comprises network connection capability for remote health-care and pathological analysis, and the medical quality and time for health-care can thus be improved.

Another objective of the present invention is to provide an electronic device for biological microscopy including a display unit and a main body adapted to the display unit. The main body includes an inspection area for a thermostat apparatus to be housed within. The inspection area includes a first side and a second side opposite to the first side. An auto-focus microscope and a computer are housed within the main body. The microscope has a U-shape or an L-shape and comprises an object lens, an eye lens, and an extension lens configured between the object lens and the eye lens. The object lens is configured at the first side of the inspection area, and a light-emitting component is configured at the second side of the inspection area. A camera electrically connected to the computer is configured on the eye lens and transmits the captured image to the computer for analysis with a pre-installed software. The computer includes an external data interface electrically connected to an inputting apparatus. The aforementioned apparatuses that require power, namely display unit, light-emitting component, microscope, camera, computer and thermostat apparatus, are electrically connected to a power supply and integrated in the main body. The electronic device for biological microscopy is thus simplified.

Another objective of the present invention is to provide an electronic device for biological microscopy, by configuring an extension lens between an eye lens and an object lens, having an L shape formed by a first section and a second section or a U shape formed by a first section, a second section, and a third section. The electronic device for biological microscopy is thus simplified and integrated into the main body and may be operated horizontally for a slide containing specimen or vertically for a container containing specimen for detection.

To achieve the above-mentioned objective, an electronic device for biological microscopy according to another embodiment of the present invention includes a main body and a display unit. The display unit and the main body are hinged or slidably adapted to each other. An inspection area for a thermostat apparatus to be housed within is configured on the main body. The inspection area includes a first side and a second side opposite to the first side. An auto-focus microscope and a computer are housed within the main body. The microscope has an L shape formed by a first section and a second section. The first section includes an object lens and an extension lens and is configured at the first side of the inspection area, and a light-emitting component is configured at the second side of the inspection area. The second section includes an eye lens and is mounted to a camera. The camera is electrically connected to a computer. The extension lens is configured between the object lens and eye lens. The computer includes an external data interface electrically connected to an inputting apparatus. The aforementioned apparatuses that require power, namely the display unit, the light-emitting component, the microscope, the camera, the computer, the thermostat apparatus, are electrically connected to a power supply and integrated in the main body. The electronic device for biological microscopy is thus simplified.

To achieve the above-mentioned objective, an electronic device for biological microscopy according to yet another embodiment of the present invention includes a main body and a display unit. The display unit and main body are hinged or slidably adapted to each other. An inspection area for a thermostat apparatus to be housed is configured on the main body. The inspection area includes a first side and a second side opposite to the first side. An auto-focus microscope and a computer are housed within the main body. The microscope has a U shape formed by a first section, a second section, and a third section. The first section includes an object lens configured at the first side of the inspection area. The second section includes an eye lens and is mounted to a camera. The camera is electrically connected to a computer. The third section includes an extension lens and is configured between the object lens and the eye lens. A light-emitting component is configured at the second side of the inspection area and provides light for the microscope. The computer includes an external data interface electrically connected to an inputting apparatus. The aforementioned apparatuses that require power, namely the display unit, the light-emitting component, the microscope, the camera, the computer, and the thermostat apparatus, are electrically connected to a power supply and integrated in the main body, and the electronic device for biological microscopy is thus simplified.

Other advantages of the present invention will become apparent from the following description taken in conjunction with the accompanying drawings wherein are set forth, by way of illustration and example, certain embodiments of the present invention.

BRIEF DESCRIPTION OF THE DRAWINGS

The foregoing aspects and many of the accompanying advantages of this invention will become more readily appreciated as the same becomes better understood by reference to the following detailed description, when taken in conjunction with the accompanying drawings, wherein.

DESCRIPTION OF THE PREFERRED EMBODIMENT

The aforementioned objectives, features, and functional characteristics of the present invention are illustrated according to following preferred embodiments with accompanying figures.

Figure 1:
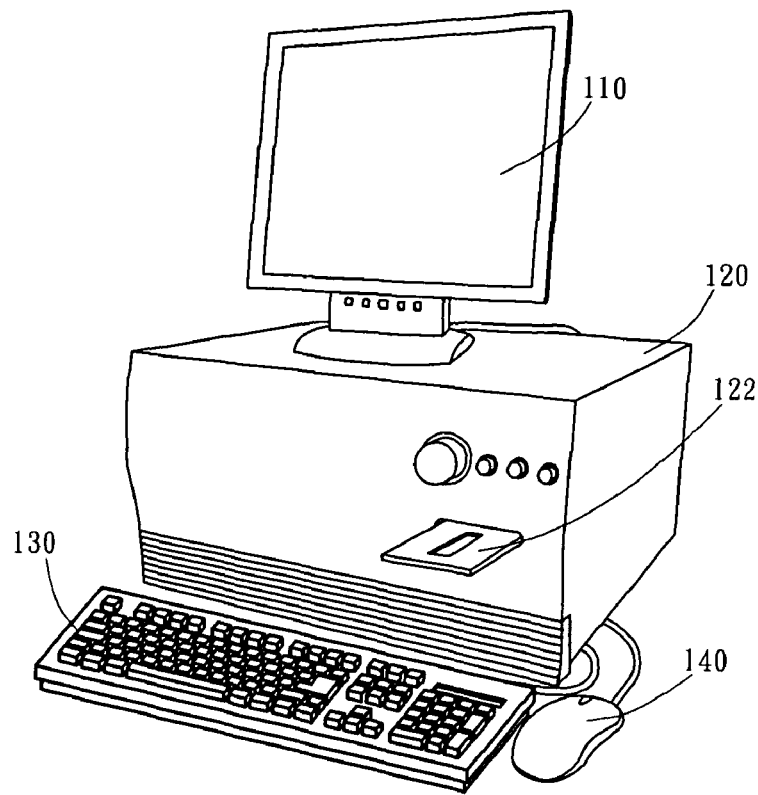
FIG. 1 is a schematic diagram illustrating a conventional specimen analyzing system.
Figure 2:
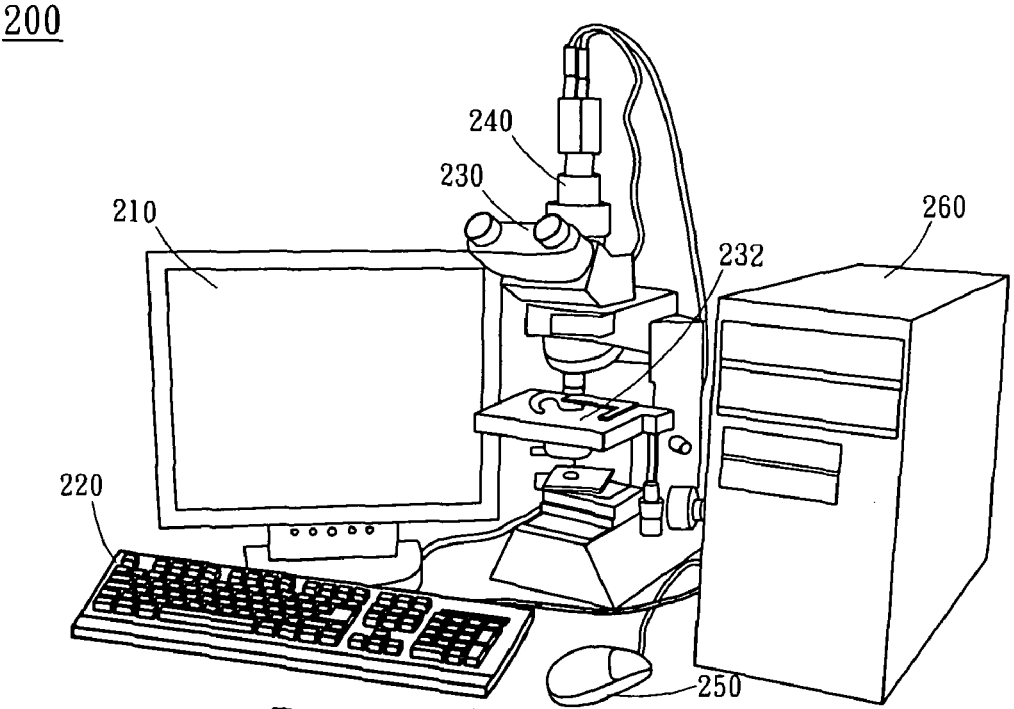
FIG. 2 is a schematic diagram illustrating a conventional specimen analyzing system.
Figure 3:
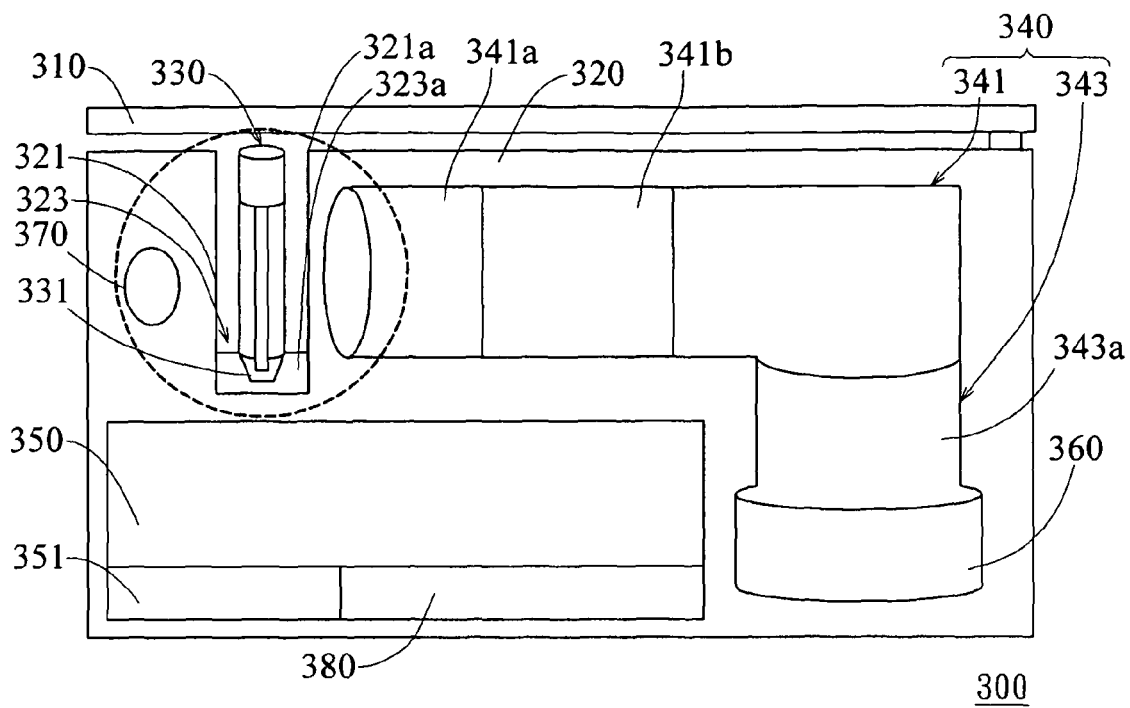
FIG. 3 is a schematic diagram illustrating an electronic device for biological microscopy having an L-shape according to a preferred embodiment of the present invention.

FIG. 3 illustrates an electronic device for biological microscopy according to a preferred embodiment of the present invention.

FIG. 3 is a schematic diagram illustrating an electronic device for biological microscopy 300, including a display unit 310 and a main body 320, wherein the main body 320 and display unit 310 are adapted to each other. To be specific, the display unit 310 may be hinged onto the main body 320; therefore, the display unit 310 may be rotated along the hinged point for movement, e.g. opening, closing, and etc. However, the adapting mechanism is not thus limited. The display unit 310 may be slidably adapted to the main body 320, i.e. the display unit 310 is driven for movements, e.g. opening, closing, and etc, by two slide bars sliding along a sliding chute configured on the display unit 310.

The aforementioned display unit 310 may be, by product category, a LCD (Liquid Crystal Display) display unit, and LED (Light-Emitting Diodes) display unit, or an OLED (Organic Light-Emitting Diodes) display unit and a monochrome display unit, a multicolor display unit, or a full-color display unit by color display category.

An inspection area 321 with an inspection opening 321a, where a thermostat apparatus 323 with a thermostatic platform 323a is housed therein, is configured on the main body 320. The inspection area 321 comprises a first side and a second side opposite to the first side. A container 330 containing specimen 331 is placed onto the thermostatic platform 323a of the thermostat apparatus 323 for detection in a vertical manner, and the thermostat apparatus 323 is used to maintain the temperature of the container 330 stable and maintain the specimen 331 at a pre-determined temperature in detecting process.

A microscope 340 and a computer 350 are housed within the main body 320. The microscope 340 may be an auto-focus single-tube microscope and has an inverted L-shape formed by a first section 341 and a second section 343. The first section 341 includes an object lens 341a and an extension lens 341b, wherein the object lens 341a faces the first side of the inspection area 321. The second section 343 includes an eye lens 343a mounted to a camera 360. A light-emitting component 370 is configured at the second side of the inspection area 320 and provides light for the microscope 340. The aforementioned extension lens 341b configured between the object lens 341a and eye lens 343a and connected with an interconnect tube is used for, in the first section 341, projecting an image of specimen at the inspection area 321 observed by the object lens 341a in the assistance of light-emitting component 370 to the eye lens 343a. In the second section 343, the image projected from the extension lens 341b to the eye lens 343a is captured by the above-mentioned camera 360 and sent to the above-mentioned computer 350 for analysis with a pre-installed software. In this preferred embodiment, the first section 341 of the microscope 340 is configured along a horizontal direction and the second section 343 is configured along a vertical direction within the main body 320.

The aforementioned computer 350 includes an external data interface 351 electrically connected to an inputting device and is electrically connected to the camera 360. The external data interface 351 may be a USB (Universal Serial Bus) interface, a RS-232 interface, an IEEE (Institute of Electrical and Electronics Engineers) 1394 interface, or a SATA (Serial Advanced Technology Attachment) interface. The external data interface 351 may be connected to a card reader to read an identification security card or a memory card for personal identification and personal data storage. In addition, the computer 350 may further comprise network connection capability, in combination of the aforementioned external data interface 351, for remote health-care and pathological analysis, and medical quality and time for health-care can thus be improved. The aforementioned inputting apparatus includes a key board and a mouse, a touch panel, or a remote controller and is used for operating the aforementioned software. Methods for connecting the computer and inputting apparatus may include wired transmission, wireless bluetooth transmission, wireless broadband transmission (such as Wi-Max), or infrared transmission.

An electronic device for biological microscopy is thus simplified by keeping the display unit 310, the light-emitting component 370, the microscope 340, the camera 360, the computer 350, and the thermostat apparatus 323 electrically connected to a power supply 380 and housed within the main body 320, is easy to carry and public use, and may be implemented in family life for general health-care service.

Figure 5:
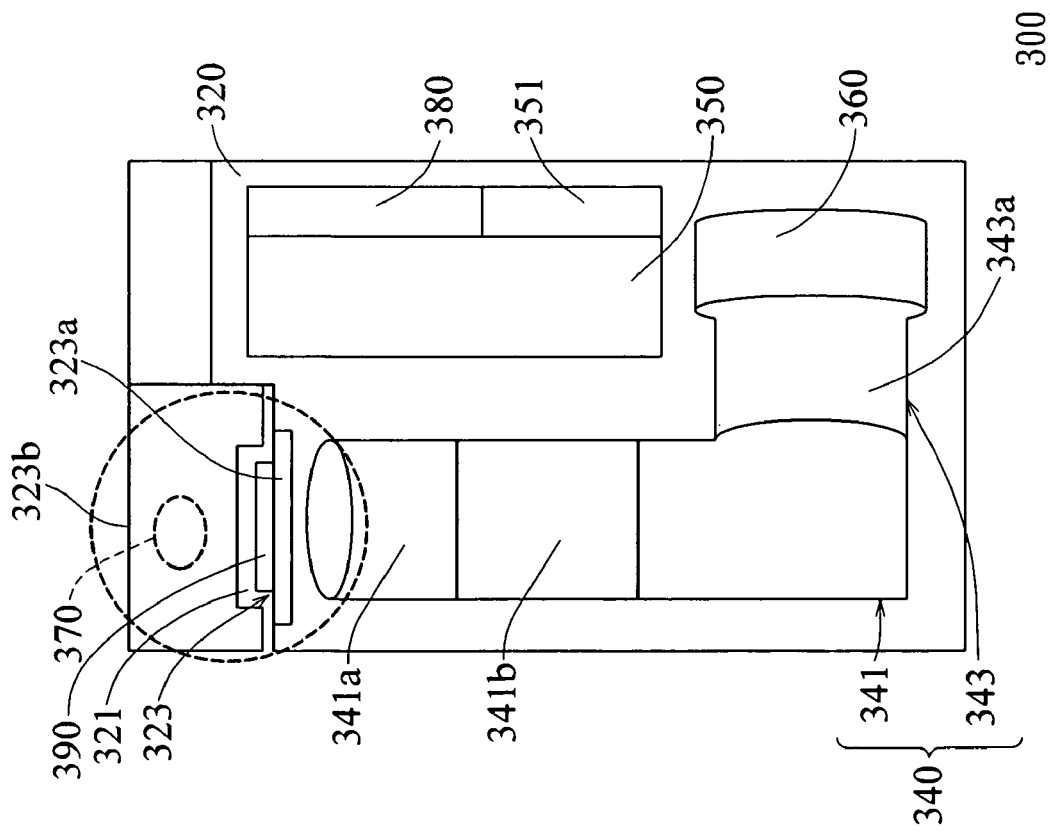
FIG. 5 is a schematic diagram illustrating an example of an electronic device for biological microscopy having an L-shape according to a preferred embodiment of the present invention.

FIG. 5 illustrates another example of the aforementioned embodiment. The first section 341 of the above-mentioned microscope 340 is configured along a vertical direction and the second section 343 is configured along a horizontal direction to form an L-shape in the main body 320. As illustrated in FIG. 5, the inspection area 321 may include an inspection support tray for a slide 390 containing specimen to be placed thereon and conveyed into the inspection area 321 in the main body 320. The inspection area 321 includes a light mask 323b configured on the main body 320 and used for shielding the light-emitting component 370. Therefore, there is enough light for observation at the object lens 341a, and the slide 390 containing specimen may be detected horizontally in this example.

Figure 4:
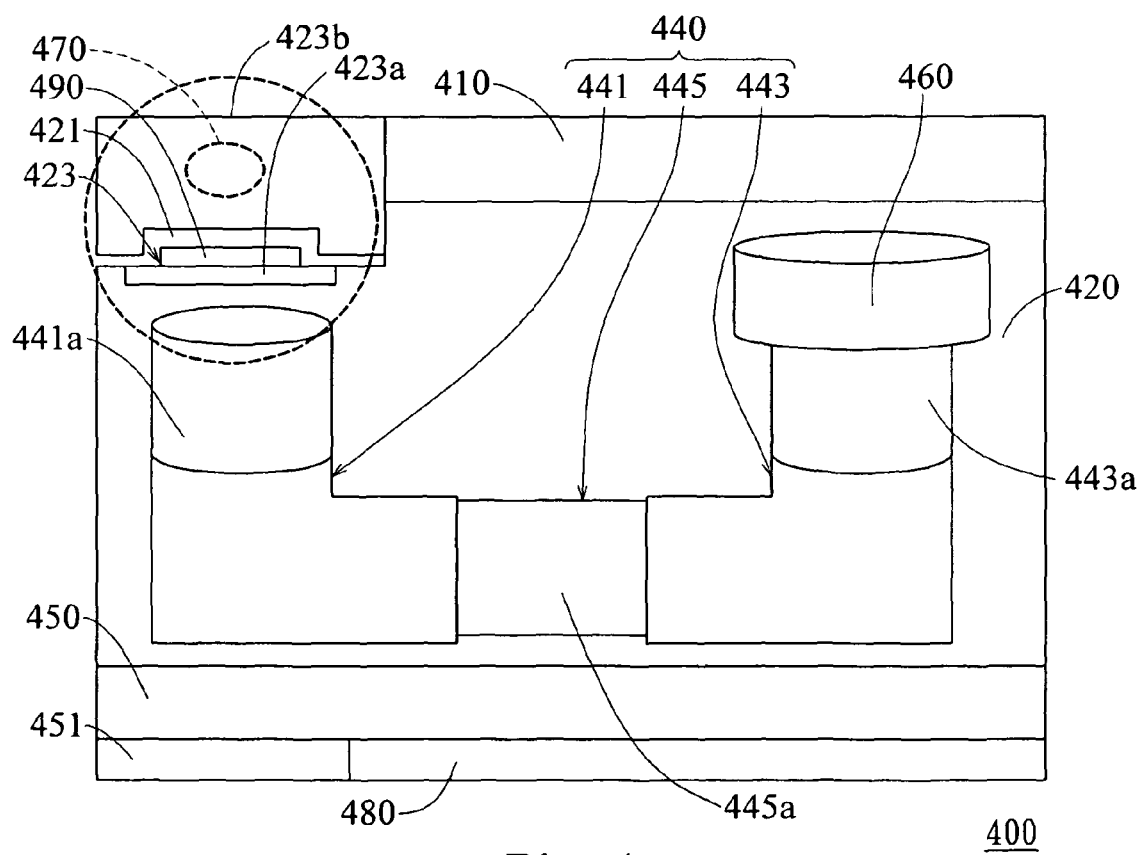
FIG. 4 is a schematic diagram illustrating an electronic device for biological microscopy having a U-shape according to another preferred embodiment of the present invention.

FIG. 4 illustrates another preferred embodiment of the present invention.

FIG. 4 is a schematic diagram illustrating an electronic device for biological microscopy 400 including a display unit 410 configured on a main body 420, wherein the adapting method and types of the display unit 410 are the same as the aforementioned embodiment.

An inspection area 421 is configured on the main body 420. The inspection area 421 comprises a first side and a second side opposite to the first side. A thermostat apparatus 423 with a thermostatic platform 423a for a slide 490 containing specimen to be placed thereon is housed within the inspection area 421. An auto-focus single-tube microscope 440 and a computer 450 are housed within the main body 420. The microscope 440 has a U-shape formed by a first section 441, a second section 443, and a third section 445. The first section 441 includes an object lens 441a configured at the first side of the inspection area 421. The second section 443 includes an eye lens 443a mounted to a camera 460. A light-emitting component 470 is configured at the second side of the inspection area 420, and provides light for the microscope 440. The third section 445 includes an extension lens 445a configured between the object lens 441a and eye lens 443a and connected with an interconnect tube and used for, in the first section 441 and second section 443, projecting an image of specimen at the inspection area 421 observed by the object lens 441a in the assistance of light-emitting component 470 to the eye lens 443a. In the third section 445, the image projected from the extension tube 445a to the eye lens 443a is captured by the above-mentioned camera 460 and sent to the above-mentioned computer 450 for analysis with a pre-installed software. In this preferred embodiment, the first section 441 and second section 443 of the microscope 440 are configured along a vertical direction and the third section 445 is configured along a horizontal direction in the main body 420. The inspection area 421 may include an inspection support tray for a slide 490 containing specimen to be placed thereon and conveyed into the inspection area 421 in the main body 420. The inspection area 421 includes a light mask 423b configured on the main body 420 and used for shielding the light-emitting component 470. Therefore, there is enough light for observation at the object lens 441a.

The aforementioned computer 450 includes an external data interface 451 electrically connected to an inputting device. The external data interface 451, inputting apparatus, and methods for electrically connecting are the same as the aforementioned embodiment.

An electronic device for biological microscopy is thus simplified by keeping the display unit 410, the light-emitting component 470, the microscope 440, the camera 460, the computer 450, and the thermostat apparatus 423 electrically connected to a power supply 480 and housed within the main body 420, is easy to carry and public use, and may be implemented in family life for general health-care service.

Figure 6:
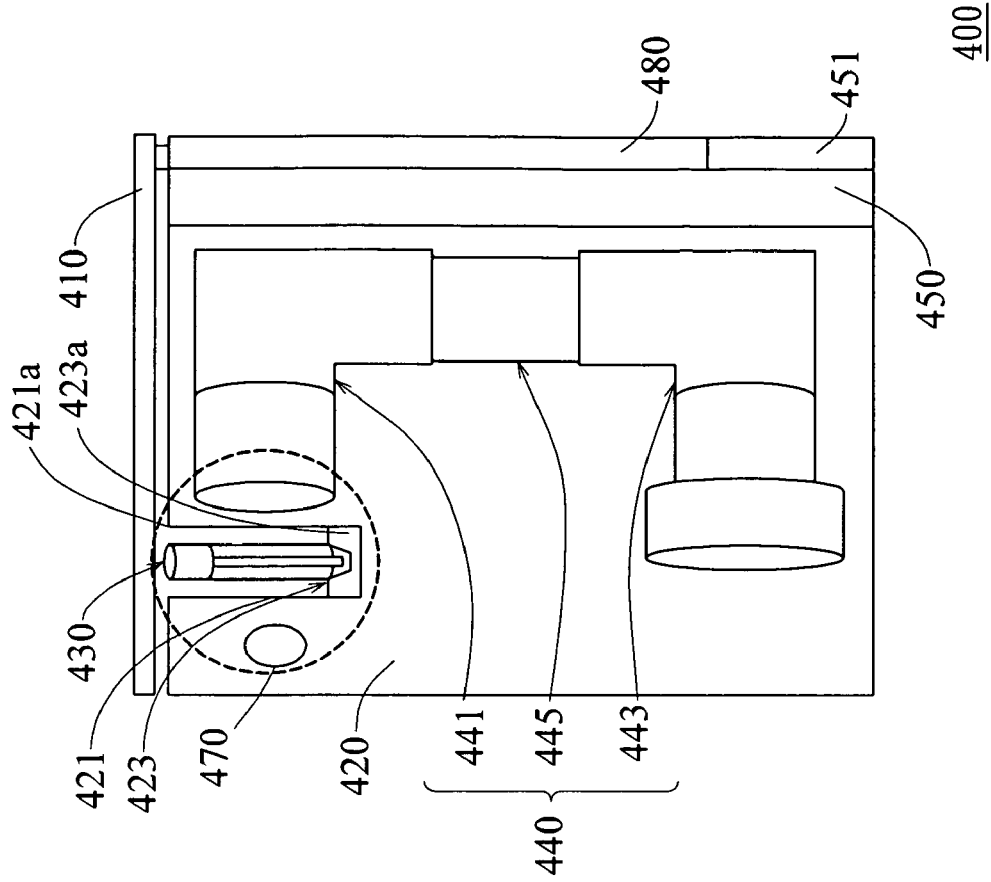
FIG. 6 is a schematic diagram illustrating an example of an electronic device for biological microscopy having a U-shape according to another preferred embodiment of the present invention.

FIG. 6 illustrates another example of the above-mentioned embodiment. The first section 441 and the second section 443 of the above-mentioned microscope 440 are configured along a horizontal direction and the third section 445 is configured along a horizontal direction to form a U-shape in the main body 420. As illustrated in FIG. 6, an inspection area 421 with an inspection area 421a, where a thermostat apparatus 423 with a thermostatic platform 423a is housed therein, is configured on the main body 420. A container 430 containing specimen may be detected vertically in this example.

To sum up, the electronic device for biological microscopy according to the present invention minimizes the inconvenience caused by equipment assembly before detecting and includes a display unit and a main body adapted to the display unit and including an inspection area for a thermostat apparatus to be housed within. The inspection area includes a first side and a second side opposite to the first side. An auto-focus microscope and a computer are housed within the main body. The microscope includes an object lens, an eye lens, and an extension lens configured between the object lens and the eye lens. The object lens is configured at the first side of the inspection area, and a light-emitting component is configured at the second side of the inspection area. A camera electrically connected to the computer is configured on the eye lens and transmits the captured image to the computer for analysis with a pre-installed software. The computer includes an external data interface electrically connected to an inputting apparatus. The aforementioned equipments that require power are electrically connected.

While the invention is susceptible to various modifications and alternative forms, a specific example thereof has been shown in the drawings and is herein described in detail. It should be understood, however, that the invention is not to be limited to the particular form disclosed, but to the contrary, the invention is to cover all modifications, equivalents, and alternatives falling within the spirit and scope of the appended claims.

What is claimed is:

1. An electronic device for biological microscopy, comprising:
   a display unit;
   a main body adapted to the display unit and comprising an inspection area having a first side and a second side opposite to the first side;
   an auto-focus microscope comprising a first section, a second section, and an extension lens, wherein
      an object lens is configured at the first section and facing the first side of the inspection area;
      an eye lens is configured at the second section and mounted to a camera; and
      the extension lens is configured between the object lens and eye lens;
   a light-emitting component configured at the second side of the inspection area, wherein the light-emitting component provides light for the microscope;
   a computer comprising an external data interface electrically connected to an inputting apparatus and electrically connected to the camera; and
   a power supply electrically connected to the display unit, the light-emitting component, the microscope, the camera, and the computer, wherein the microscope, the light-emitting component, the computer, the power supply are housed within the main body.

2. The electronic device for biological microscopy as claimed in claim 1, wherein the first section, the second section, and the extension lens are arranged in an L-shape.

3. The electronic device for biological microscopy as claimed in claim 1, wherein the first section, the second section, and the extension lens are arranged in a U-shape.

4. The electronic device for biological microscopy as claimed in claim 1, wherein the inspection area further comprises an inspection support tray including a thermostat apparatus.

5. The electronic device for biological microscopy as claimed in claim 1, wherein the inspection area comprises a light mask configured on the main body.

6. The electronic device for biological microscopy as claimed in claim 1, wherein a thermostat apparatus with a thermostatic platform is configured at the inspection area.

7. The electronic device for biological microscopy as claimed in claim 1, wherein the display unit comprises a LCD (Liquid Crystal Display) display unit, and an LED (Light-Emitting Diodes) display unit, or an OLED (Organic Light-Emitting Diodes) display unit.

8. The electronic device for biological microscopy as claimed in claim 1, wherein the display unit comprises a monochrome display unit, a multicolor display unit, or a full-color display unit.

9. The electronic device for biological microscopy as claimed in claim 1, wherein the inputting apparatus comprises a keyboard and a mouse.

10. The electronic device for biological microscopy as claimed in claim 1, wherein the inputting apparatus comprises a touch panel.

11. The electronic device for biological microscopy as claimed in claim 1, wherein the inputting apparatus comprises a remote controller.

12. The electronic device for biological microscopy as claimed in claim 1, wherein the computer and the inputting apparatus communicate with each other by a wired transmission, a wireless bluetooth transmission, a wireless broadband transmission, or an infrared transmission.

13. The electronic device for biological microscopy as claimed in claim 1, wherein the external data interface comprises a USB (Universal Serial Bus) interface, a RS-232 interface, an IEEE (Institute of Electrical and Electronics Engineers) 1394 interface, or a SATA (Serial Advanced Technology Attachment) interface.

* * * * *